UNITED STATES PATENT OFFICE.

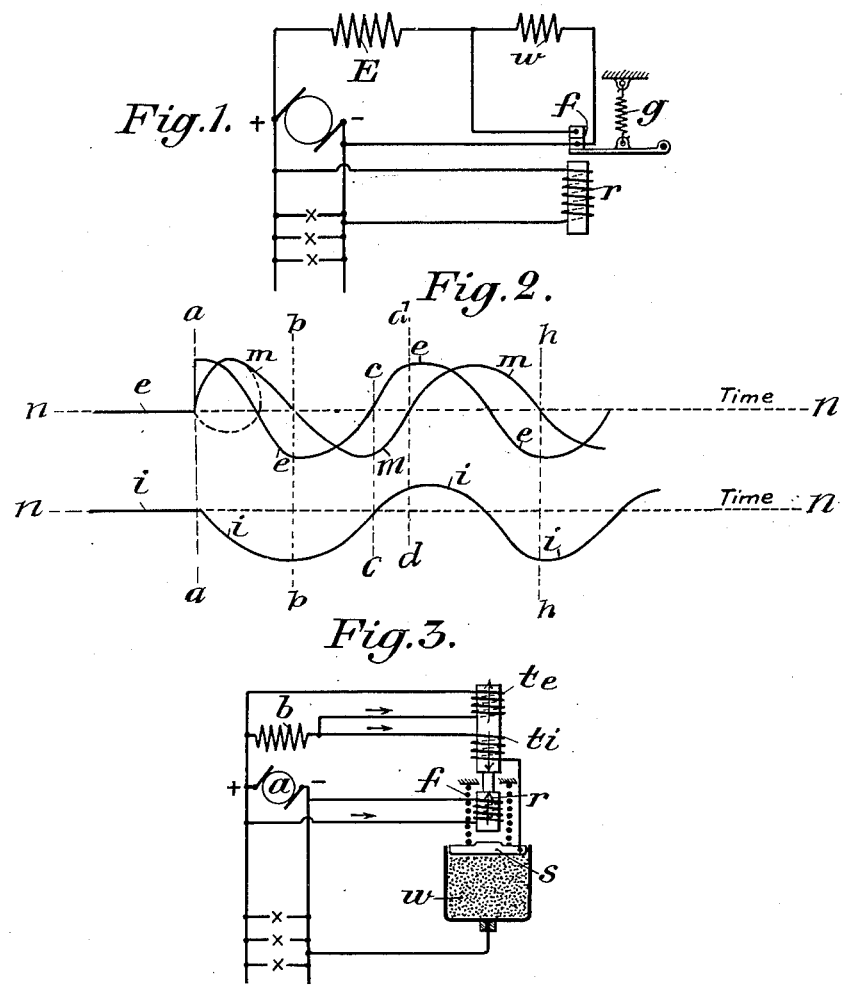

AUGUST KAZENMAIER, OF STUTTGART, GERMANY, ASSIGNOR, BY MESNE ASSIGNMENTS, TO AMERICAN BOSCH MAGNETO CORPORATION, OF NEW YORK, N. Y., A CORPORATION OF NEW YORK.

ELECTRIC REGULATOR.

1,333,662.     Specification of Letters Patent.     Patented Mar. 16, 1920.

Application filed July 15, 1918. Serial No. 245,085.

*To all whom it may concern:*

Be it known that I, AUGUST KAZENMAIER, a subject of the German Emperor, residing at and whose post-office address is Stuttgart, Mühlrain 9/I, Germany, have invented certain new and useful Improvements in Electric Regulators; and I do hereby declare the following to be a full, clear, and exact description of the invention, such as will enable others skilled in the art to which it appertains to make and use the same.

The present invention relates to regulators for electric generators or motors, whose speed or load is liable to fluctuate and whose potential or current, or both, are to be kept at an approximately constant value. With quick acting regulators heretofore employed for this purpose, oscillations occurred affecting the constancy of the value to be regulated.

In the accompanying drawings, Figure 1 is a diagrammatic representation of a well known form of vibrator regulator for maintaining a constant potential at the terminals of a shunt wound generator; Fig. 2 illustrates the oscillations set up thereby; and Fig. 3 is a diagrammatic representation of the regulator of the invention applied, as an example, to a shunt wound generator for maintaining a constant potential at the terminals thereof.

The manner in which the oscillations occur with the regulator of Fig. 1 will be explained first. The resistance $w$ is alternately cut in and out of the circuit of the shunt field winding E by the contact at $f$ controlled by a magnet $r$, the winding of which is connected across the terminals of the generator. When the potential of the generator rises suddenly, the strength of the magnet increases to such an extent that the contact at $f$ is opened against the tension of the spring $g$, and the resistance $w$ inserted in the field circuit, thus decreasing the field current. This condition is indicated at $a$—$a$ in Fig. 2, where $e$ represents the potential at the terminals of the generator, $i$ the field current, and $m$ the ampere-turns of the winding of magnet $r$. The decrease of the field current $i$ causes a decrease of potential $e$ which, in turn, should result in so rapid a decrease of the ampere-turns $m$ and so rapid a restoration of the contact at $f$, that the resistance $w$ is short-circuited before the potential and current fall appreciably below the normal indicated by the line $n$—$n$. However, instead of such prompt closure of the contact at $f$, the self induction of the winding of magnet $r$ acts to maintain the ampere-turns, so that the current and potential continue to decrease below the normal, until the ampere-turns reach the normal at $b$—$b$, whereupon the spring $g$ closes the contact at $f$, again short-circuiting the resistance $w$ and causing an increase of field current. So also, when the potential $e$ and current $i$ reach the normal at $c$—$c$, the ampere-turns have not yet increased sufficiently to open the contact at $f$. Not until the line $d$—$d$ is reached, is the spring $g$ overcome by the magnet, the potential and current then being above the normal. The potential and current then begin to decrease, but the contact at $f$ is not closed until the line $h$—$h$ is reached, at which time the ampere-turns have attained the normal, but the potential and current are below their normal. In this way, due to the self induction of the winding of the magnet $r$, and also due to the inertia of the magnet armature controlling the contact at $f$, the ampere-turns continually lag behind the potential and current, closing the contact at $f$ to short-circuit the resistance $w$ after the potential $e$ and current $i$ are below the normal and opening the contact to insert the resistance after the potential and current are above the normal. In this way, the oscillations of the potential $e$ and current $i$ have such amplitude and such duration, that it is often impossible for a regulator of this kind to regulate the generator to a constant potential, or to any other constant quantity.

In prior arrangements for reducing these oscillations, an additional magnet coil producing an additional magnetizing force is connected to a transformer excited by the field current, or to the coil of a transformer whose magnetism is derived from the field of the dynamo to be regulated. The present invention employs a simpler arrangement than that using a transformer. The additional magnetic force is produced by a restoring winding on the magnet consisting of two opposed coils, one of which is in series with the field winding, and the other of which is in parallel with the field winding of the dynamo to be regulated. Preferably the two coils are equal so as to neutralize each other under stable conditions, or so nearly so that the desired operation of the regulator is insured. In this way, two small coils take the place of the special transformer of the prior arrangements.

In Fig. 3, the variable speed generator $a$ has a shunt field winding $b$. A resistance $w$, consisting of carbon granules, is inserted in the field circuit, and the pressure member $s$ forms the armature of the magnet $r$ whose winding is connected across the terminals of the generator. The spring $f$ tends to depress the armature in opposition to the upward pull of the magnet $r$. The restoring winding consists of two opposed coils, of which $t_i$ is in series with the field winding $b$ and $t_e$ is connected across the field winding. Under stable conditions of the generator $a$, the ampere-turns of the two coils $t_i$ and $t_e$ are equal.

The operation of the regulator is as follows: Assume that the potential at the terminals of the generator $a$ rises suddenly. The magnet $r$ increases the resistance $w$, but since that resistance is in series with the field winding $b$, the potential between the terminals of coil $t_e$ decreases at a more rapid rate than the current flowing through the field winding $b$, since the potential between the terminals of the field winding $b$ decreases as a result of the increased drop in the resistance $w$, while the self induction of the field winding and the coil $t_i$ tends to maintain the normal value of current through the increased resistance $w$. During this transitional period in which the field current is decreasing, the ampere-turns of the coil $t_e$ are less than those of $t_i$, so that the increase of ampere-turns in the winding of magnet $r$ resulting from the initiating rise of potential of the generator, is quickly overcome thereby. Then, as the spring $f$ starts to depress the armature $s$ to decrease the resistance $w$, the ampere-turns of coil $t_e$ increase faster than those of $t_i$, so that their difference assists the winding of magnet $r$ in pulling up the armature $s$. The result is that the regulator is caught quicker as the potential rises above and falls below its normal in oscillating upon a sudden increase of potential, than is the case in the arrangement shown in Fig. 1, and the generator is thus brought to a stable condition sooner, by reducing the amplitude and the duration of the oscillations of the armature $s$.

If, on the other hand, the terminal potential of the generator $a$ decreases suddenly, the spring $f$ first decreases the resistance $w$. Then since the ampere-turns of coil $t_e$ increase faster than those of coil $t_i$, due to the self induction of the field winding $b$ and of the coil $t_i$, the restoring winding of the magnet acts quickly to increase the resistance until the field current falls below the normal, when the restoring winding quickly checks the decrease.

In this way the amplitude and duration of the oscillations of the terminal potential and the field current are reduced as compared with the arrangement of Fig. 1, and the generator $a$ is brought sooner to a stable condition, whether the potential of the generator rises or falls even suddenly. Furthermore, it will be understood that the greater the potential deviates from the normal, the stronger will be the action of the restoring winding in reducing the amplitude and duration of the oscillation of the regulator.

The regulator of Fig. 3 may also be used with a series generator or in conjunction with the field winding of an electric motor. The winding of magnet $r$ may also be inserted in the supply circuit so as to maintain a constant current instead of a constant potential. Combinations of series and shunt windings may also be employed without departing from the spirit or scope of the invention.

Whenever the quantity to be regulated has not reached the normal (for example, in starting a lighting generator on a moving vehicle), the field current should be large in order that the normal may be reached as quickly as possible. But this may be retarded by a regulator consisting merely of the magnet $r$ and its winding, as in Fig. 1, since that winding tends to increase the field resistance during the period in which the quantity to be regulated is increasing. If the ampere-turns of the coils $t_e$ and $t_i$ merely neutralize each other under stable conditions, this objection is not overcome, but if the coil $t_i$ slightly predominate over the coil $t_e$, the resistance-increasing effect of the magnet will be counteracted sufficiently in this period to insure a rapid building up of the field of the generator. Of course, the ampere-turns of coil $t_i$ must predominate over those of coil $t_e$ by such a slight amount that the restoring effect forming the object of this invention is still attained.

Having thus described my invention, what I claim is:

1. The combination with a dynamo having a field winding, of a regulator for the dynamo comprising a resistance effective to change the current in the field winding, a magnet effective to alter the resistance, and a restoring winding on the magnet having two opposed coils, one in series and the other in parallel with the field winding.

2. The combination with a dynamo having a field winding, of a regulator for the dynamo comprising a resistance effective to change the current in the field winding, a magnet effective to alter the resistance, and a restoring winding on the magnet having two opposed coils, one in series and the other in parallel with the field winding, the two opposed coils substantially neutralizing each other at normal conditions of the dynamo.

3. The combination with a dynamo having a field winding, of a regulator for the dynamo comprising a resistance effective to change the current in the field winding, a magnet which is effective to alter the resistance and which has a winding energized by an electric quantity produced by the dynamo, and a restoring winding on the magnet having two opposed coils, one in series and the other in parallel with the field winding.

4. The combination with a dynamo having a field winding, of a regulator for the dynamo comprising a resistance effective to change the current in the field winding, a magnet which is effective to alter the resistance and which has a winding energized by an electric quantity produced by the dynamo, and a restoring winding on the magnet having two opposed coils, one in series and the other in parallel with the field winding, the two opposed coils substantially neutralizing each other at normal conditions of the dynamo.

5. The combination with a dynamo having a field winding, of a regulator for the dynamo comprising a resistance effective to change the current of the field winding, a magnet which is effective to alter the resistance and which has a winding connected across the terminals of the dynamo, and a restoring winding on the magnet having two opposed coils, one in series and the other in parallel with the field winding.

6. The combination with a dynamo having a field winding, of a regulator for the dynamo comprising a resistance effective to change the current of the field winding, a magnet which is effective to alter the resistance and which has a winding connected across the terminals of the dynamo, and a restoring winding on the magnet having two opposed coils, one in series and the other in parallel with the field winding, the two opposed coils substantially neutralizing each other at normal conditions of the dynamo.

In testimony whereof I affix my signature, in presence of two witnesses.

AUGUST KAZENMAIER.

Witnesses:
HERMAN SCHNEIDER,
ADOLF LEBLURZ.